(12) United States Patent
Keys et al.

(10) Patent No.: US 7,213,096 B2
(45) Date of Patent: May 1, 2007

(54) OPERATING A REMOTE USB HOST CONTROLLER

(75) Inventors: John S. Keys, Beaverton, OR (US); John S. Howard, Portland, OR (US); Abdul R. Ismail, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 445 days.

(21) Appl. No.: 10/814,505

(22) Filed: Mar. 31, 2004

(65) Prior Publication Data

US 2005/0223119 A1 Oct. 6, 2005

Related U.S. Application Data

(60) Provisional application No. 60/521,070, filed on Feb. 16, 2004.

(51) Int. Cl.
*G06F 13/12* (2006.01)
*G06F 13/00* (2006.01)

(52) U.S. Cl. .................................................. 710/313

(58) Field of Classification Search ................ 710/105, 710/305–315, 52–56, 72; 709/208, 230
See application file for complete search history.

(56) References Cited

U.S. PATENT DOCUMENTS

| | | | |
|---|---|---|---|
| 5,890,015 A * | 3/1999 | Garney et al. ................ 710/62 |
| 6,356,968 B1 * | 3/2002 | Kishon ........................ 710/306 |
| 6,389,029 B1 * | 5/2002 | McAlear ...................... 370/402 |
| 6,567,875 B1 | 5/2003 | Williams et al. |
| 6,708,247 B1 * | 3/2004 | Barret et al. ................. 710/313 |
| 6,782,443 B2 * | 8/2004 | Ferguson ..................... 710/313 |
| 6,904,489 B2 * | 6/2005 | Zarns ........................... 710/315 |
| 2002/0116565 A1 * | 8/2002 | Wang et al. .................. 710/313 |
| 2003/0088727 A1 * | 5/2003 | Zarns ............................ 710/313 |
| 2003/0163587 A1 * | 8/2003 | Knight et al. ................ 709/249 |
| 2004/0090984 A1 * | 5/2004 | Saint-Hilaire et al. ....... 370/463 |
| 2005/0138229 A1 * | 6/2005 | Sartore ......................... 710/15 |
| 2005/0209842 A1 * | 9/2005 | Klein ............................ 703/25 |

\* cited by examiner

*Primary Examiner*—Christopher Shin
(74) *Attorney, Agent, or Firm*—Schwabe, Williamson & Wyatt, P.C.

(57) ABSTRACT

An apparatus and method for remote USB host controlling are described herein.

20 Claims, 4 Drawing Sheets

OPERATING A REMOTE USB HOST CONTROLLER

This application claims the benefit of U.S. Provisional Application No. 60/521,070, entitled "Remote USB Host Controlling" and filed Feb. 16, 2004.

FIELD OF THE INVENTION

The present invention relates generally to the field of device connectivity.

BACKGROUND OF THE INVENTION

A conventional Universal Serial Bus ("USB") architecture is based on Master/Slave communications, where the Master in the system is called a USB host controller ("host controller"). Conventional host controllers are tightly integrated in a "host" platform, e.g., integrated into a processor, processor chipset, as a bus master controller on a Peripheral Control Interface ("PCI") or other "inside the box" bus or the like. A USB host includes applications, device drivers (which manage attached USB devices), a USB bus driver (which provides a standard USB bus services abstraction to USB device drivers), a host controller driver, and a physical USB host controller (of which there are several types), all of which manages data communications for a bus. The host controller provides status and control mechanism to allow a USB host to manage USB ports for connecting USB devices and/or USB hubs. USB hubs are devices for allowing one or more USB devices (through additional one or more additional ports) to connect back through the hub to a USB port. Under Universal Serial Bus Specification v2.0, up to 127 devices may be connected to a single host controller.

Conventional host controllers provide a register and memory-based interface that the host controller driver utilizes to accomplish data transfers between the system and connected USB devices. Registers provide status control information for "root ports" of a host controller as well as management and general status/control information about data transfers. Memory-based interfaces provide control/status information Registers are for status & control of root ports, host controller management and general status/control information about data transfers. Memory-based interface is for control/status specific to data transfers. A conventional USB system software implementation provides a buffer-oriented streaming service for USB device drivers. A USB device driver submits buffer input/output ("I/O") requests to the USB bus driver, which in turn sends the buffer to the appropriate USB host controller driver. The USB host controller driver then gives the buffer to the host controller hardware utilizing its specific interface. In effect, the entire stack is buffer oriented.

An artifact of conventional USB hosts is that they have tightly integrated host controllers. Accordingly, USB devices must be within a prescribed distance of the USB host. The distance is governed by the length of the cables and the length of the cables are a function of the protocol parameters, which limit the maximum flight time. Therefore conventional USB controllers are limited in the distance they may connect to USB devices.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Figure 1:
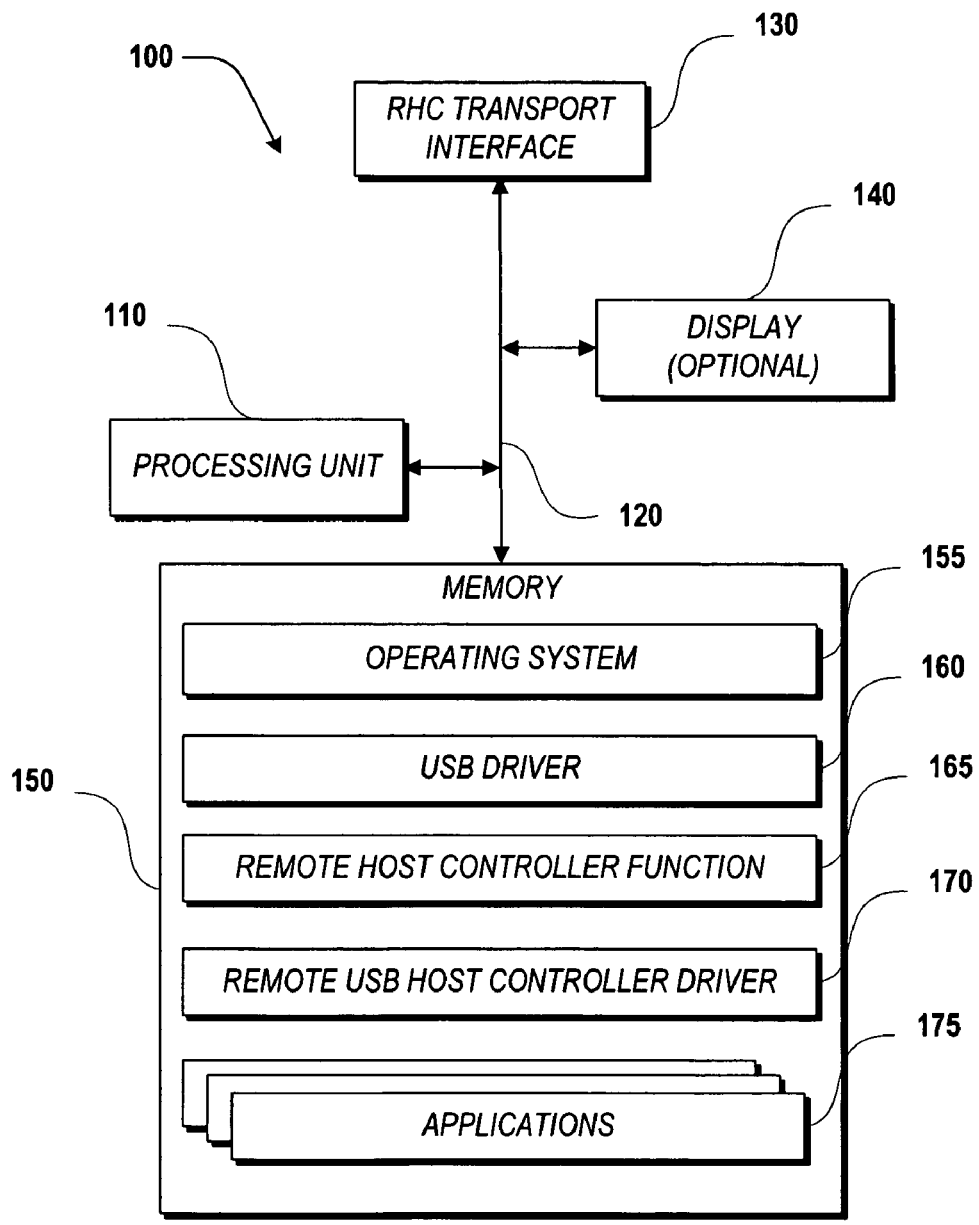
FIG. 1 illustrates a block diagram view of a computing environment, in accordance with an embodiment of the present invention.

Illustrative embodiments of the present invention include, but are not limited to, a buffer-oriented abstraction that allows a host controller to be physically located somewhere other than inside a USB host computer.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Further, various operations and/or communications will be described as multiple discrete operations and/or communications, in turn, in a manner that is most helpful in understanding the present invention; however, the order of description should not be construed as to imply that these operations and/or communications are necessarily order dependent. In particular, these operations and/or communications need not be performed in the order of presentation.

The phrase "in one embodiment" is used repeatedly. The phrase generally does not refer to the same embodiment; however, it may. The terms "comprising," "having" and "including" are synonymous, unless the context dictates otherwise.

Embodiments of the present invention define an architecture that allows a USB host controller to be physically located somewhere other than "inside" the USB host (e.g., host computer). In other words, a USB host controller may be "remoted" from a traditional host platform. In various embodiments, the remote USB host controller ("remote host controller") enhances the architecture of the traditional USB host system software by extending the flexible, buffer-oriented USB interface to allow USB connections to be mapped over multiple link technologies including, but not limited to: local area networks ("LANs"), wide area networks ("WANs"), personal area networks ("PANs"), telephone networks (e.g., POTs, PBXs, etc.), wireless links (e.g., wireless telephone networks, 802.11 networks, Blue-Tooth, etc.), USB, Institute of Electrical and Electronic Engineers ("IEEE") 1394, powerlines and the like. Although the abstraction in various exemplary embodiments are USB-centric (to allow easy integration with existing software stacks) other embodiments may not be USB-centric. In any case, the devices downstream of the remote host controller may or may not be USB devices. Accordingly, the abstraction allows the exemplary implementation of the remote host controller to expose devices connected downstream as USB devices to a USB host, regardless of whether they are native USB devices or not.

By providing a well-defined abstraction at the lowest driver layer, the remote host controller may also provide a standardized means of bridging the USB host system software to non-USB applications (such as powerline-based home automation), which allows non-USB technologies to make use of the rich set of application support present in the USB device class specifications and drivers.

A remote host controller extends in at least two ways the model of how devices may connect to a host computer. First, it allows USB devices that are physically separate from the host computer to connect to the host computer. For example, USB printers and scanners in one room of a home can be connected to a computer in another room, using some other connection (for example wired or wireless LAN) between the two rooms. Second, a remote host controller allows devices to use a different physical link as the connection between the remote host controller and the device. In other words, the remote host controller provides a single point standardized interface for bridging USB support software to other types of physical hardware. This model, for example, may be the basis for how Wireless USB may be introduced. It could also allow devices that are connected to powerlines (e.g. home appliances, light switches, receptacles, etc.) to be connected to computers and show up as USB devices, giving the computer a standardized way to interface with and control these devices.

Another benefit of using one or more remote host controllers in a computing environment is that with a plurality of host controllers (either remote controllers or a local host controller with one or more remote host controllers) there is a corresponding increase in the number of USB ports accessible to a USB enable computer as each host controller manages its own set of USB ports.

FIG. 1 illustrates an exemplary host computer 100 suitable for use in embodiments of the present invention. Those of ordinary skill in the art and others will appreciate that the host computer 100 may include many more components than those shown in FIG. 1. However, it is not necessary that all of these generally conventional components be shown in order to disclose an enabling embodiment for practicing the present invention. As shown in FIG. 1, the host computer 100 includes a transport interface 130 for connecting to remote devices (not shown) through a remote USB host controller (not shown). As described earlier, transport interface 130 may be a transport interface designed to support a LAN, WAN, PAN, telephone network, powerline connection, serial bus (USB) or wireless connection. Transport interface 130 includes the necessary circuitry, driver and/or transceiver for such a connection and is constructed for use with the appropriate protocols for such a connection. The word "remote" as used in "remote USB host controller" and other terms of the like in the specification and in the claims refers to the ability of remote host controller, by itself or in combination with a local USB host controller, to allow USB or non-USB devices to be capable of being located at a greater distance than specified by the Universal Serial Bus Specification v2.0.

The host computer 100 also includes a processing unit 110, an optional display 140 and a memory 150, all interconnected along with the transport interface 130 via a bus 120. Those of ordinary skill in the art and others will appreciate that the display 140 may not be necessary in all forms of computing devices and, accordingly, is an optional component. The memory 150 generally comprises random access memory ("RAM"), a read only memory ("ROM") and a permanent mass storage device, such as a disk drive, flash RAM, or the like. The memory 150 stores an operating system 155 and at least one USB driver 160 (e.g., a specific USB device driver, miniport driver, or some combination of drivers) formed in accordance with embodiments of the present invention. In various embodiments, memory 150 also stores at least one remote host controller function 165 (e.g. miniport), at least one remote USB host controller driver 170 and applications 175. It will be appreciated by those of ordinary skill in the art and others, that while the USB driver 160, remote host controller function 165, remote host controller driver 170 and applications 175 are described as separate individual software components, they may actually be comprised of multiple software components; or may in fact be sub-parts of one or more integrated software components.

It will be appreciated that the software components may be loaded from a computer readable medium into memory 150 of the host computer 100 using a drive mechanism (not shown) or network mechanism (not shown) associated with the computer readable medium, such as a floppy, tape, DVD/CD-ROM drive, flash RAM, or network interface card.

Although only one remote host controller transport interface 130 is shown, one or more local USB host controllers (not shown) may optionally be included in the host computer 100. In various embodiments, remote host controller function 165, remote host controller driver 170 and remote host controller transport interface 130 facilitate a remote host controller 300 in connecting host computer 100 with external devices, for example, devices for reading and/or writing a machine readable medium, digital cameras, printers, digital music players/recorders such as MP3 players, etc. Various input devices may also be coupled to personal computer 100 via elements 165, 170 and 130, such as, for example, keyboards or mice.

Figure 2:
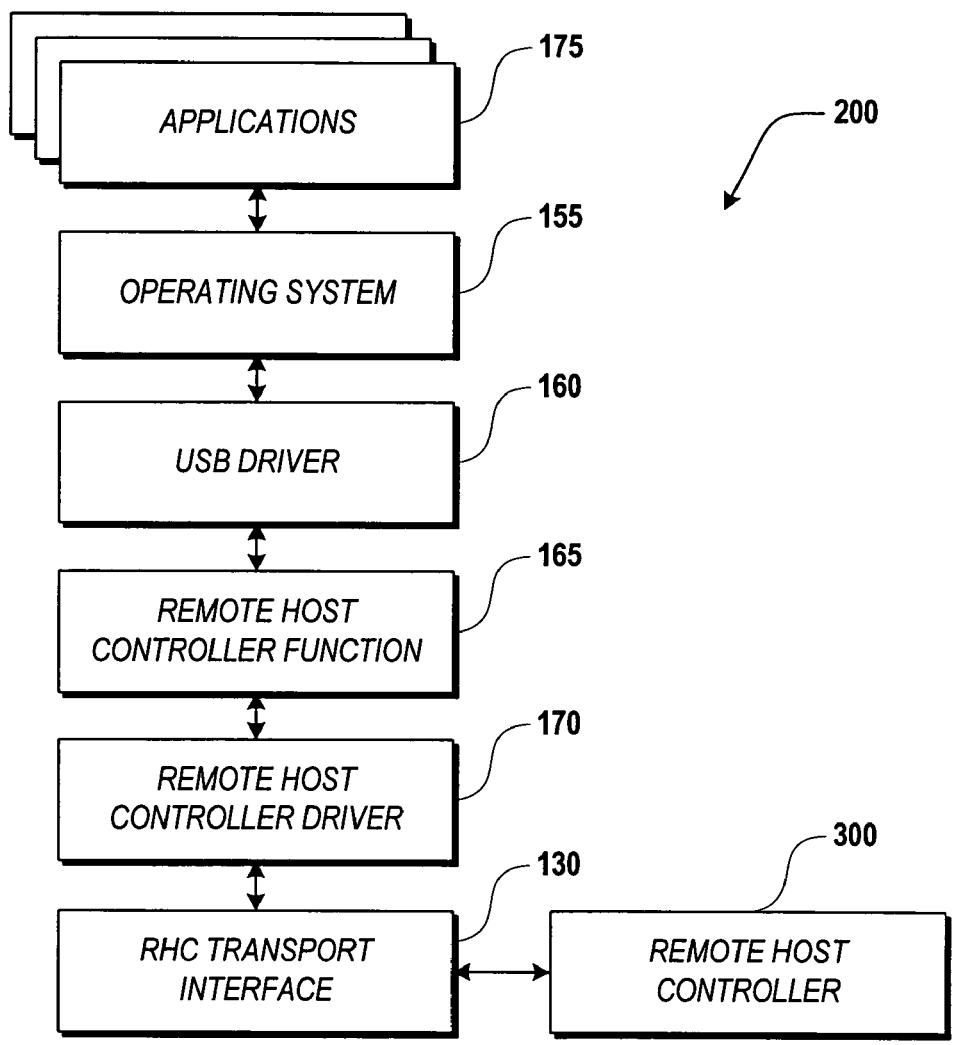
FIG. 2 illustrates the couplings of software components of FIG. 1 to communicate with the remote host controller, in accordance with one embodiment of the present invention.

FIG. 2 illustrates the couplings of software components of FIG. 1 to communicate with the remote host controller 300, in accordance with one embodiment of the present invention. Generally, an implementation of the remote host controller system in accordance with an embodiment of the present invention includes a remote host controller function 165, a remote host controller driver 170 and remote host controller transport interface 130 through which an operating system 155 may communicate with and control the remote host controller 300 via USB driver 160. In one embodiment, applications 175 provide the necessary logical connections with remote USB devices (not shown) that are connected via the remote host controller 300. Hereinafter, remote host controller transport interface 130 may also be referred to as remote host controller media transport.

USB driver 160 performs its conventional functions, i.e. making buffer I/O requests to remote host controller function 165 and servicing returns from remote host controller function 165, as if remote host controller function 165 in combination with remote host controller driver 170 and transport interface 130 constitute a "local USB host controller". Accordingly USB driver 160 may be implemented in any one of a number of device class dependent manners. Remote host controller function 165 cooperates with a counterpart on the remote host controller 300 to effectuate the buffer I/O requests made by USB driver 160 for the function(s) supported by remote host controller function 165. In various embodiments, multiple remote host controller functions 165 may be employed to support multiple functions. The implementation of each remote host controller function 165 is function dependent. Remote host controller driver 170 is equipped to package the buffer I/O request (independent of the nature of the function supported by remote host controller function 165) into a suitable transmission format (e.g., Ethernet) for transmission by remote host controller transport interface 130, in accordance with the remote host controller protocol (e.g. a Transmission Control Protocol/Internet Protocol ["TCP/IP"] based message protocol). Remote host controller driver 170 is also equipped to extract the USB contents from reply messages received from remote host controller 300 through remote host controller transport interface 130.

Figure 3:
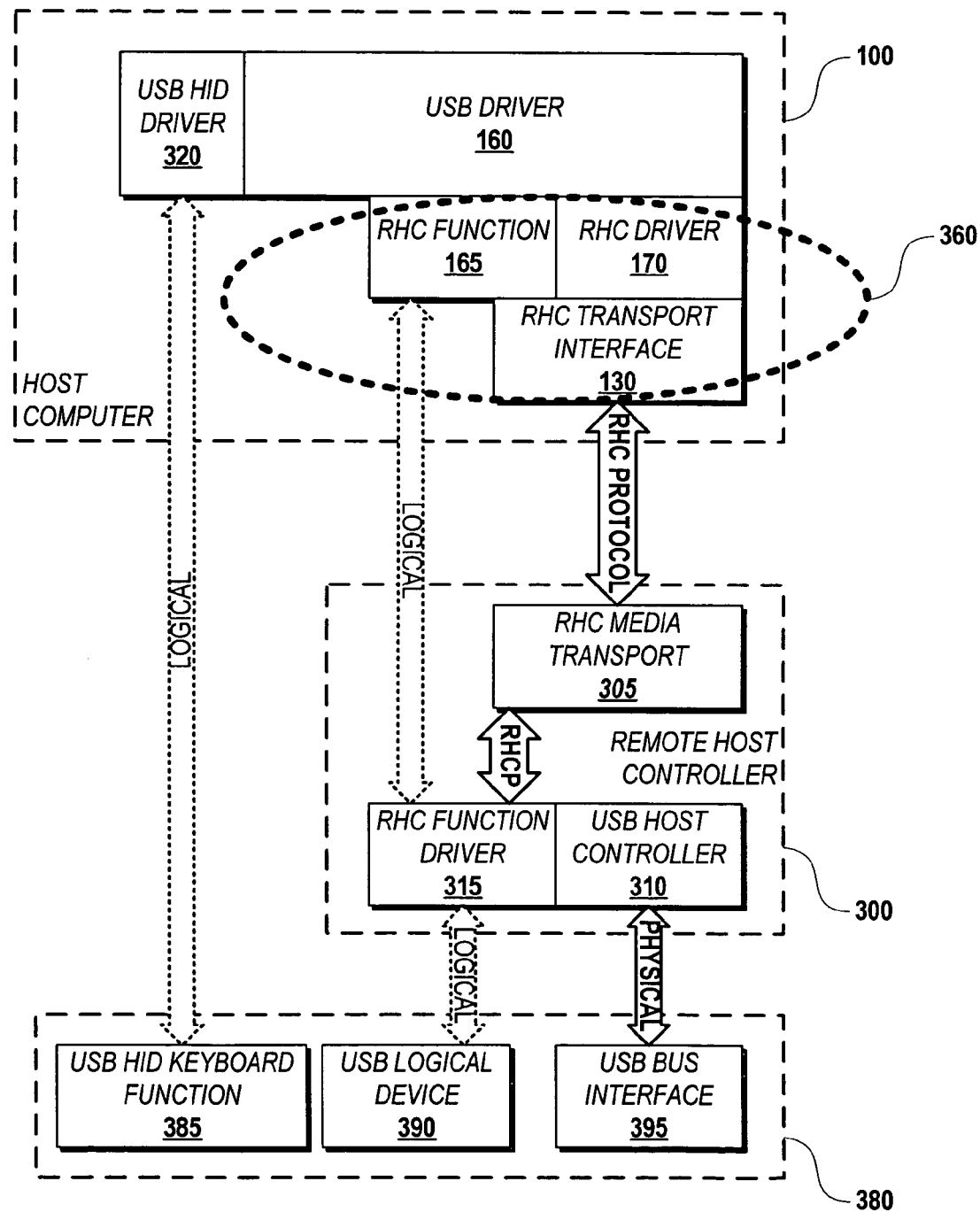
FIG. 3 illustrates a block diagram view of a computing system environment with a host computer and a remote host controller, in accordance with an embodiment of the present invention.

FIG. 3 illustrates one exemplary embodiment of the present invention where a host computer 100 is connected through a remote host controller 300 to a remotely located USB device, USB keyboard 380. Those of ordinary skill in the art and others will appreciate that the device arrangement shown in FIG. 3 is merely one arrangement of devices in accordance with one exemplary embodiment of the present invention, and that other configurations of devices, including non-USB devices and or non-USB communication links, may be used with other embodiments of the present invention.

The host computer 100 includes a number of software and hardware components used to communicate through a remote host controller 300 with a remotely located USB device, USB keyboard 380. One such component is a USB human interface device ("HID") driver 320 which is the device driver used to logically control the USB keyboard 380. The USB keyboard 380 also includes USB HID keyboard functions 385 that are logically controlled by the host computer's USB HID driver 320. The host computer 100 also includes a USB driver 160 that provides USB functionality to the host computer 100.

Additionally, the host computer 100 also includes an abstraction layer 360 used to "abstract" the connection between the host computer 100 and the remote host controller 300. The abstraction layer 360 includes a remote host controller function 165, a remote host controller driver 170 and remote host control media transport 130. The remote host controller function 165 logically communicates with a remote host controller function driver 315 of the remote host controller 300 through remote host controller driver 170, remote host controller media transport 130, and corresponding remote host controller media transport 305 of remote host controller 300. More specifically, the physical communication path between the remote host controller driver 170 and the remote host controller 300 goes through the remote host controller media transport 130, via a remote host controller protocol, to remote host controller media transport 305 on the remote host controller 300. The remote host controller media transport 305 further communicates with the remote host controller function driver 315, also via a remote host controller protocol (either the same or another remote host controller protocol).

The remote host controller 300 also includes its own USB host controller 310 that physically connects with remote USB devices, e.g., USB keyboard 380. The USB host controller 310 physically connects with a USB bus interface 395 of the USB keyboard 380. However, the logical connection between the remote host controller 300 and the USB keyboard 380 is between the remote host controller function driver 315 and a USB logical device 390 of the USB keyboard 380. As already noted above, the high level communication and control of the USB keyboard is handled via a USB HID keyboard function 385 of the USB keyboard 380, which communicates with a USB HID driver 320 on the host computer 100 (through the earlier described logical and physical connections between host computer 100 and remote host controller 300, and remote host controller 300 and USB keyboard 380).

As can be seen from the above description of a remotely located USB keyboard 380 connected to a host computer 100 via a remote host controller 300, embodiments of the present invention allow devices to be "remoted" from the host computers to which they are to be connected.

It will be appreciated by those of ordinary skill in the art and others that the devices shown in FIG. 3 are merely one exemplary configuration of one embodiment of the present invention and that more or fewer components may be included. For example, the drivers (USB driver 160, host controller function 165 and remote host controller driver 170) of the host computer are shown as separate individual drivers. In other embodiments of the present invention more or fewer drivers may be used to facilitate communications between USB devices, local and remote host controllers. In still other embodiments, alternate communication paths, both logical and physical, may be used to pass signals between components.

FIGS. 4a–d illustrate other exemplary embodiments of the present invention, including exemplary embodiments where non-USB devices may be coupled to a host computer with USB driver, allowing the host computer to operate with the non-USB devices using its USB stack. Non-USB devices may include, but are not limited to, other serial bus devices (such as IEEE 1394), local area network devices or parallel interface devices.

Figure 4A:
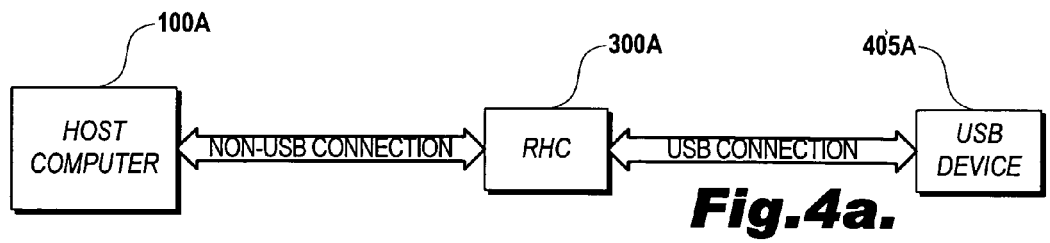
FIGS. 4a–d illustrate exemplary configurations of host systems connected to remote host controllers, in accordance with embodiments of the present invention.

FIG. 4a illustrates a configuration of an embodiment of the present invention wherein a host computer 100A has a non-USB wireline connection to remote host controller 300A, but has a USB connection to a USB device 405A. Those of ordinary skill in the art and others will appreciate that the logical communications with the USB device 405A from the host computer 100A may continue using USB drivers as the remote host controller 300A and the abstraction layer 360 on the host computer abstracts out the non-USB connection so that logical communications with the USB device 405A can continue without having to introduce separate non-USB connection drivers.

Figure 4B:
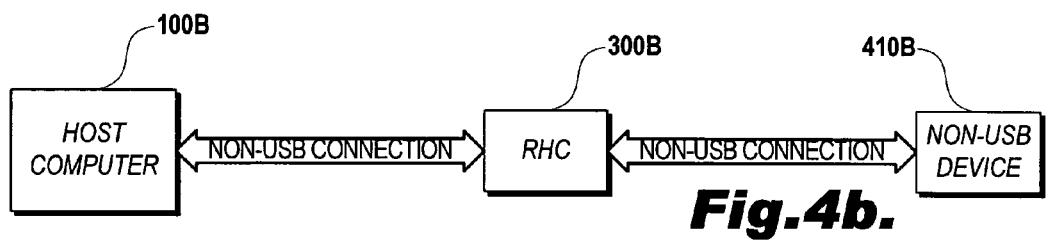

FIG. 4b illustrates one exemplary embodiment where a host computer 100B has a non-USB wireline connection to a remote host controller 300B which in turn has a non-USB wireline connection to a non-USB device 410B. For the embodiment, USB host controller 310 is replaced with a non-USB host controller suitable for the non-USB connection. Remote host controller function driver 315 may be further equipped to handle the translation between the USB commands and the non-USB commands. Such an embodiment of the present invention, while not making use of any USB connections, can still utilize the abstraction layer 360 of the host computer 100B to treat the non-USB device for 100B as a USB device and, therefore, utilize USB device drivers to communicate with and/or control the non-USB device 410B.

Figure 4C:
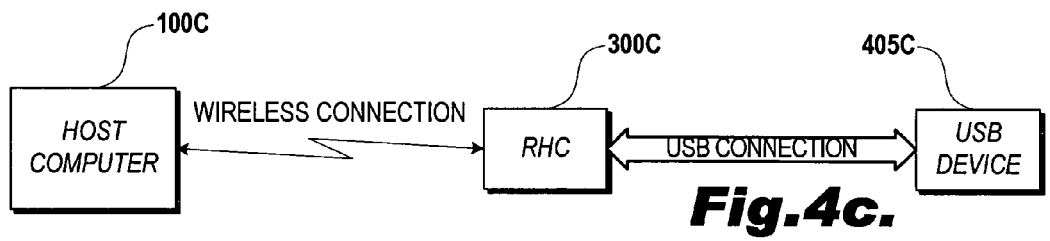

FIG. 4c is similar to FIG. 4a, however, the transport media between the host computer 100C and the remote host controller 300C is a wireless connection. That is, remote host controller media transports 130 and 305 are equipped to support a wireless connection between host computer 100 and remote host controller 300. The remote host controller 300C in turn has a USB connection to the USB device 405C.

Figure 4D:
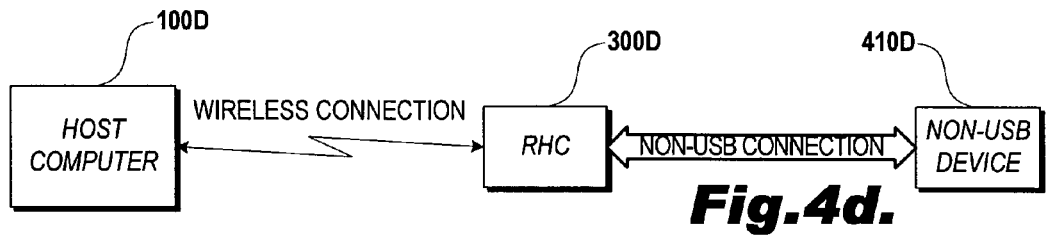

Similarly, in FIG. 4*d* the host computer 100D has a wireless connection to the remote host controller 300D. Accordingly, remote host controller media transports 130 and 305 are similarly equipped as earlier described for FIG. 4*c*. However, the remote host controller 300D has a non-USB connection to non-USB device 410D like FIG. 4*b*. That is, USB host controller 310 is replaced with a non-USB host controller, and remote host controller function driver 315 is equipped to handle translations between USB and non-USB commands as earlier described.

Although specific embodiments have been illustrated and described herein, it will be appreciated by those of ordinary skill in the art that a wide variety of alternate and/or equivalent implementations may be substituted for the specific embodiments shown and described without departing from the scope of the present invention. This application is intended to cover any adaptations or variations of the embodiments discussed herein. Therefore, it is manifestly intended that this invention be limited only by the claims and the equivalents thereof.

What is claimed is:

1. A system comprising:
   a computer including:
      a processor, and
      a memory coupled to said processor, having a USB driver and an abstraction of a remote host controller; and
   a remote host controller, coupled with and remotely disposed from said computer, operating in combination with said abstraction of a remote host controller as a USB host controller of the computer.

2. The system of claim 1, further comprising a remote device coupled to said remote host controller.

3. The system of claim 2, wherein said remote device is a selected one of a digital camera, a printer, a digital music player/recorder, a keyboard and a cursor control device.

4. The system of claim 1, wherein said abstraction of a remote host controller comprises a remote host controller function equipped to provide function specific processing for a USB buffer I/O request of a function of the remote host controller.

5. The system of claim 1, wherein said abstraction of a remote host controller comprises a remote host controller driver equipped to provide function independent processing to format a USB buffer I/O request for transmission to the remote host controller.

6. The system of claim 1, wherein said abstraction of a remote host controller comprises a media transport equipped to transmit a USB buffer I/O request formatted for a media type over a media of the media type to the remote host controller.

7. The system of claim 6, wherein said remote host controller comprises a media transport of like type, a remote host function driver coupled to the media transport of the remote host controller and a USB host controller.

8. The system of claim 6, wherein said media includes a communications link selected from the group consisting of: local area networks, wide area networks, personal area networks, telephone networks, parallel interfaces, wireless links, USB, IEEE 1394 and powerlines.

9. A remote USB host controller comprising:
   a media transport to communicate with a counterpart media transport of an abstraction of the remote USB host controller disposed in a remotely located host computer;
   a remote host controller function driver coupled to the media transport to process a USB buffer I/O request from a remote host controller function of the abstraction of the remote USB host controller; and
   a USB host controller coupled to the remote host controller function driver to facilitate coupling of a USB device to the remotely located host computer.

10. The remote USB host controller of claim 9, wherein the media transports are equipped to support a media selected from the group consisting of: local area networks, wide area networks, personal area networks, telephone networks, wireless links, USB, IEEE 1394 and powerlines.

11. The remote USB host controller of claim 9, where the remote host controller function driver comprises support for a miniport function.

12. A remote host controller comprising:
   a media transport to communicate with a counterpart media transport of an abstraction of the remote host controller disposed in a remotely located host computer, the host computer including a USB driver coupled to the abstraction of the remote host controller;
   a remote host controller function driver coupled to the media transport to process a USB buffer I/O request from a remote host controller function of the abstraction of the remote host controller, the remote host controller function driver being also equipped to translate USB commands to non-USB commands and vice versa; and
   a non-USB host controller coupled to the remote host controller function driver to facilitate coupling of a non-USB device to the remotely located host computer.

13. The remote host controller of claim 12, wherein the media transports are equipped to support a media selected from the group consisting of: local area networks, wide area networks, personal area networks, telephone networks, parallel interfaces, wireless links, USB, IEEE 1394 and powerlines.

14. The remote host controller of claim 12, wherein the non-USB host controller comprises hardware to support the control of devices utilizing communication media link selected from the group consisting of: local area networks, wide area networks, personal area networks, telephone networks, parallel interfaces, wireless links, USB, IEEE 1394 and powerlines.

15. A method of connecting a USB device to a host computer, the method comprising:
   coupling a remotely disposed host controller to a host computer having a USB driver and an abstraction of the remote host controller; and
   coupling a USB device to a USB host controller of the remote host controller.

16. The method of claim 15, wherein the abstraction of the remote host controller and the remote host controller comprise complementary media transport equipped to support transmission over a media of a media type, and the method further comprises formatting a USB buffer I/O request for transmission from the host computer to the remote host controller over the media.

17. The method of claim 15, wherein the method further comprises recovering the USB buffer I/O request on receipt at the remote host controller.

18. A method of connecting non-USB devices to a host computer as USB devices, the method comprising:
- coupling a remotely disposed host controller to a host computer having USB capabilities and an abstraction of the remote host controller, wherein the remote host controller is equipped to receive a non-USB device and operative to convert between USB signals and at least one type of non-USB signals; and
- coupling a non-USB device to said host computer through said remote host controller.

19. The method of claim 18, wherein the abstraction of the remote host controller and the remote host controller comprise complementary media transport equipped to support transmission over a media of a media type, and the method further comprises:

- formatting a USB buffer I/O request for transmission from the host computer to the remote host controller over the media; and

- recovering the USB buffer I/O request on receipt at the remote host controller.

20. The method of claim 19, wherein the method further comprises translating the USB buffer I/O request to a non-USB buffer I/O request.

* * * * *